US006964799B1

(12) United States Patent
Mizuno et al.

(10) Patent No.: US 6,964,799 B1
(45) Date of Patent: Nov. 15, 2005

(54) SHRINKAGE CONTROL MATERIAL AND ELASTOMERIC MOLDING

(75) Inventors: Seinosuke Mizuno, Tokyo (JP); Yoshiyuki Nishi, Chiba-ken (JP); Yasunari Ashida, Mie-ken (JP); Tatsumi Hirano, Mie-ken (JP)

(73) Assignees: Nippon Ply Co., Ltd., Tokyo (JP); Showa Electric Wire & Cable Co., Ltd., Kawasaki (JP)

( * ) Notice: Subject to any disclaimer, the term of this patent is extended or adjusted under 35 U.S.C. 154(b) by 0 days.

(21) Appl. No.: 09/680,401

(22) Filed: Oct. 5, 2000

(30) Foreign Application Priority Data

Oct. 6, 1999 (JP) .............................. P11-285608

(51) Int. Cl.[7] .............................................. B29D 22/00

(52) U.S. Cl. .................. 428/35.9; 428/35.7; 428/35.8; 428/36.8; 428/375; 138/45; 49/479.1; 524/439; 156/307.3; 156/331.2

(58) Field of Search .............................. 428/375, 35.8, 428/35.9, 36.8; 138/145; 156/307.3, 331.2; 524/439; 49/479.1

(56) References Cited

U.S. PATENT DOCUMENTS

| | | | | |
|---|---|---|---|---|
| 3,715,371 A * | 2/1973 | Thomson | .................... | 534/558 |
| 3,951,723 A * | 4/1976 | Wright | ....................... | 152/525 |
| 4,218,349 A * | 8/1980 | Minatono et al. | ........... | 525/207 |
| 4,300,973 A * | 11/1981 | Bezwada | ................. | 156/307.7 |
| 4,331,496 A * | 5/1982 | Orndorff, Jr. | ............... | 156/187 |
| 4,376,838 A * | 3/1983 | Davis et al. | ................ | 524/184 |
| 4,480,066 A * | 10/1984 | Davis et al. | ................ | 524/439 |
| 4,891,267 A * | 1/1990 | Takahashi et al. | .......... | 428/367 |
| 5,085,905 A * | 2/1992 | Beck | ......................... | 428/35.9 |
| 5,158,113 A * | 10/1992 | Ozawa et al. | ............... | 138/137 |
| 5,566,510 A * | 10/1996 | Hollingshead et al. | ..... | 49/479.1 |
| 6,193,835 B1 * | 2/2001 | Yoshikawa et al. | ......... | 156/281 |

FOREIGN PATENT DOCUMENTS

| | | | | |
|---|---|---|---|---|
| JP | 401212633 A * | 8/1989 | ........... | B60R 13/04 |
| JP | 2594537 * | 8/1991 | ........... | B29C 47/02 |
| JP | 8-258106 | 10/1996 | | |
| JP | 8-270728 | 10/1996 | | |
| JP | 8-334939 | 12/1996 | | |
| JP | 9-302330 | 11/1997 | | |
| JP | 11-230250 | 8/1998 | | |
| JP | 2594537 | 2/1999 | | |
| JP | 11-82612 | 3/1999 | | |

* cited by examiner

*Primary Examiner*—Rena Dye
*Assistant Examiner*—Tamra Dicus
(74) *Attorney, Agent, or Firm*—Oblon, Spivak, McClelland, Maier & Neustadt, P.C.

(57) ABSTRACT

A shrinkage control material for elastomeric molding. On a surface of a resilient metal wire, an adhesive layer of a halogenated polymer-based or olefin-based adhesive is disposed. An elastomeric molding includes the shrinkage control material and a elastomeric extrusion formed around the shrinkage control material to cover, the elastomeric extrusion being bonded by vulcanization to the shrinkage control material.

2 Claims, 1 Drawing Sheet

10

20

SHRINKAGE CONTROL MATERIAL AND ELASTOMERIC MOLDING

BACKGROUND OF THE INVENTION

1. Field of the Invention

The present invention relates to a shrinkage control material used for various kinds of molding, a door window glass run channel or the like for automobiles, and bead material for window frames or the like for buildings, and to a elastomeric molding using the same.

2. Description of the Related Art

Various kinds of molding and window door glass run channel for automobiles, window frame beads for buildings or the like are generally formed of rubber or resin by means of extrusion.

In the extrusion products of rubber or resin as mentioned above, in order to prevent the rubber or resin from shrinking to deform due to temperature variation during molding or use, a resilient metal wire is used to bury. In burying the wire, it is general that the metal wire is passed through a coater to coat an adhesive around an outer periphery thereof. Thereafter, while introducing the adhesive coated metal wire into an extruder, around the outer periphery thereof rubber or resin is extruded.

However, in the method like this, there is a problem that the adhesive coater is necessary to be disposed before the extruder to result in a complicated process control.

To this problem, a shrinkage control material or a reinforcement material has been developed in which, on a surface of a metal wire, melt-bonding varnish is coated and baked in advance to dispose a melt-bonding layer.

According to the shrinkage control material, due to heat during extrusion of the rubber or resin, the hot-melt layer is once melted, thereafter together with the rubber or resin being cooled to solidify into one body. Accordingly, the adhesive coater is not required to be disposed ahead of the extruder.

For the melt-bonding varnish to be coated on the surface of the metal wire, so far the melt-bonding varnish based on polyester resin is generally used.

However, the polyester resin based varnish is a little weaker in adhesion to the rubber than to the resin. Accordingly, there is a problem that the shrinkage control material using the polyester resin based melt-bonding varnish can not exhibit an expected shrinkage prevention effect in a rubber molding.

Accordingly, a shrinkage control material that is excellent in adhesion to the rubber and can exhibit a sufficient shrinkage prevention effect to the rubber is desired to develop.

SUMMARY OF THE INVENTION

It is an object of the present invention is to provide a shrinkage control material that is excellent in adherence with elastomeric material and can exhibit a sufficient shrinkage prevention effect to elastomeric material, and an elastomeric molding with the shrinkage control material.

According to one aspect of invention, a shrinkage control material includes a resilient metal wire, and an adhesive layer coated and heated on the metal wire, the adhesive layer having adhesion to elastomeric material.

The adhesive layer preferably comprises a halogenated polymer- or olefin-based adhesive.

According to another aspect of invention, an elastomeric molding comprises a shrinkage control material, and an elastomeric extrusion formed around an outer periphery of the shrinkage control material. The shrinkage control material includes a resilient metal wire, and an adhesive layer coated and heated on the metal wire, the adhesive layer having adhesion to elastomeric material. The elastomeric extrusion is bonded by vulcanization to the shrinkage control material.

The adhesive layer preferably comprises a halogenated polymer- or olefin-based adhesive.

According to ane aspect of the present invention, the adhesive layer of a shrinkage control material has adhesion to various kinds of elastomeric material. That is, due to heat, pressure or the like during extrusion and vulcanization of an elastomeric material, the adhesive layer is vulcanized to bond solidly the metal wire to the elastomeric material, followed by cooling to solidify into one body. Therefore, the shrinkage control material can be applied to various kinds of elastomeric material to exhibit an excellent shrinkage prevention effect. The adhesive layer of halogenated polymer- or olefin-based adhesive has excellent adhesion to the various kinds of elastomeric material. The shrinkage control materials using them can prevent the shrinkage more effectively.

DETAILED DESCRIPTION OF PREFERRED EMBODIMENTS

In the following, Embodiments of the present invention will be detailed with reference to the drawings.

Figure 1:
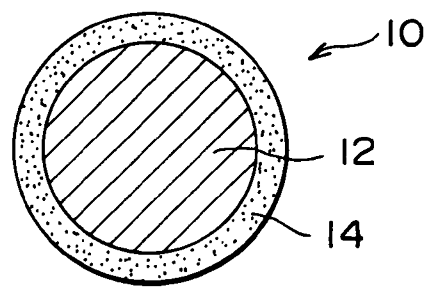
FIG. 1 is a cross sectional view of an embodiment of a shrinkage control material of the present invention.

Referring to FIG. 1 of the drawings, there is shown an embodiment of a shrinkage control material of the present invention indicated generally by the numeral 10.

The shrinkage control material 10 comprises a resilient metal wire 12 generally circular in cross section, and an adhesive layer 14 coated and heated on the the metal wire 12, the adhesive layer 14 having a halogenated polymer- or olefin-based adhesive.

The resilient metal wire 12 will be made of brass, iron, iron alloy, steel such as stainless steel, phosphor bronze, nickel silver or the like. Iron and iron alloy are preferable to implement brass plating, zinc plating, or other suitable plating on the surface thereof to use, for they tend to be oxidized in the air to be brittle.

The metal wire 12, without restricting to one of circular cross-section mentioned in the embodiment, may be one configured in other cross-section such as pillar shape. Alternatively, the metal wire 12 may be formed in a structure where a plurality of metal wires of circular cross-section is stranded. Further, in order to improve adherence to the rubber described later, a surface can be roughened, or corrugated in a longer length direction.

The adhesive layer 14 is preferably formed by coating and heating the halogenated polymer- or olefin-based adhesive, or other adhesive on an outer periphery of the metal wire 12. The adhesive layer 14 formed thus does not show tackiness at normal temperature but it shows adhesion when vulcanized by heating under pressure.

A preferred halogenated polymer-based adhesive is one comprising a chlorinated rubber and a chlorosulfonated polyethylene rubber, such as THIXON GPO (trade name) by Morton International Co. or Metalock F-10 (trade name) by Toyo Kagaku Kenkyusho. A preferred olefin-based adhesive is Chemlok 238, 250, 250X (all trade names) by Road Far East Inc. or TPO-300 (trade name) by The Yokohama Rubber Co., Ltd. Furthermore, a thickness of the adhesive layer 14, when EPDM (ethylene-propylene-diene ternary copolymer) rubber is extruded on the layer 14 and THIXON GPO is used as the adhesive, is preferably in the range of 5 to 25 μm, more preferably in the range of 12 to 22 μm. When the thickness of the layer 14 is less than 5 μm or exceeds 25 μm, it will not show enough adhesion strength to prevent the shrinkage of the EPDM rubber.

The shrinkage control material 10 comprises the metal wire 12 and the adhesive layer 14. The adhesive layer 14, when a elastomeric material such as EPDM rubber is extruded thereon, is vulcanized together with the elastomeric material under heat and pressure during extrusion and vulcanization to strongly bond the elastomer extrusion to the metal wire 12. Thereafter, the adhesive layer 14 is cooled with the elastomeric extrusion to solidify to exhibit excellent shrinkage prevention effect to various kinds of elastomeric molding.

Figure 2:
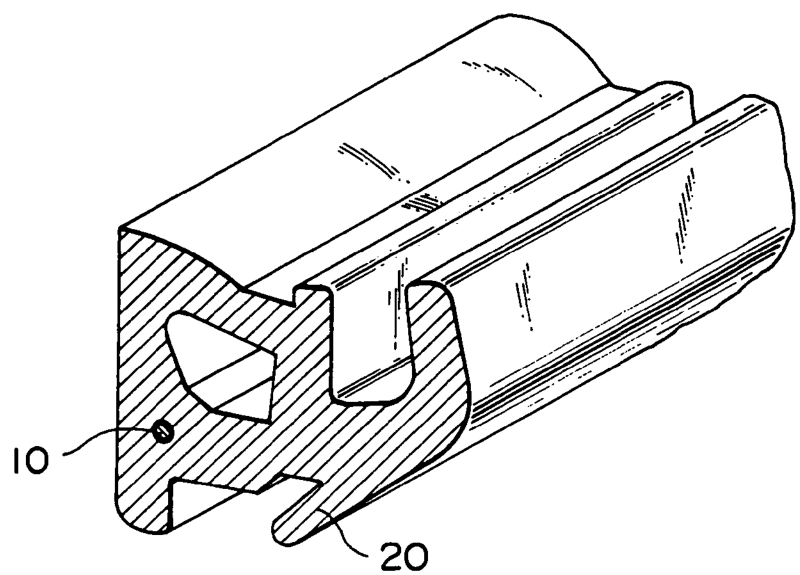
FIG. 2 is a perspective view of an embodiment of a rubber molding of the present invention having the shrinkage control material of FIG. 1.

FIG. 2 is a perspective view of one example of an automobile window molding with the shrinkage control material 10. Inside the extrusion 20 of an elastomeric material such as EPDM rubber that is extruded in a prescribed sectional shape and vulcanized, the shrinkage control material 10 is buried. The metal wire 12 and the elastomeric extrusion 20 are bonded through the adhesive layer 14 of the shrinkage control material 10.

A material of the elastomeric extrusion 20 may be ethylene propylene copolymer rubber, natural rubber, styrene rubber, chloroprene rubber, buthyl rubber, or nitrile rubber. In a preferred embodiment, the material of the elastomeric extrusion 20 is EPDM rubber.

The window molding will be produced by introducing the shrinkage control material 10 into an extruder, and extruding a material of the extrusion 20 around the shrinkage control material 10 to vulcanized. The adhesive layer 14 of the shrinkage control material 10 is vulcanized under heat and pressure during extrusion or vulcanization to be cooled/cured in one body together with the elastomeric extrusion 20. Thereby, the metal wire 12 and the elastomeric extrusion 20 are strongly bonded to be sufficiently suppressive of shrinkage or deformation in a longer length direction of the elastomeric extrusion 20 due to temperature variation.

More than one shrinkage control material may be buried in the elastomeric extrusion 20.

The invention will now be explained in more detail by way of the following non-limiting examples, in which all Young's modulus values are values measured under gauge length of 25 mm, tensile testing speed of 1 mm/min, and 2.5% elongation according to JIS K 7113.

EXAMPLE 1

On a brass plated stainless steel wire of a diameter of 0.25 mm, THIXON GPO was coated and baked to be a layer thickness of 9 μm after baking, thereby obtaining a shrinkage control material.

Next, while introducing the obtained shrinkage control material into the extruder, around the shrinkage control material, EPDM was extruded to cover, thereby an automobile window molding as shown in FIG. 2 being manufactured.

EXAMPLES 2 to 4

By implementing identically with Example 1 other than changing the thickness of the adhesive layer after baking to 14 μm (Example 2), 18 μm (Example 3) or 21 μm (Example 4), shrinkage control materials were obtained. Further, with these shrinkage control materials, as identical as Example 1, automobile window moldings were manufactured.

COMPARATIVE EXAMPLE 1

By implementing identically with Example 1 other than changing the adhesive to TCV PA-18A (Totoku Toryo Co., Ltd.) that is a polyester-based adhesive, a shrinkage control material was obtained. Further, with this shrinkage control material, as identical as Example 1, an automobile window molding was manufactured.

COMPARATIVE EXAMPLES 2 to 4

By implementing identically with Comparative Example 1 other than changing the thickness of the adhesive layer after baking to 14 μm (Comparative Example 2), 18 μm (Comparative Example 3) or 21 μm (Comparative Example 4), shrinkage control materials were obtained. Further, with these shrinkage control materials, as identical as Comparative Example 1, automobile window molding were manufactured.

With these window moldings obtained in the aforementioned examples and comparative examples, adhesive strength between the shrinkage control material and the EPDM extrusion was measured by means of the pultrusion method. The results and the configurations of the adhesive layers are shown in Table.

TABLE 1

| | Kind of adhesive * | Thickness of adhesive layer (μm) | Adhesive strength (kgf) | Remarks |
|---|---|---|---|---|
| Example 1 | THIXON GPO | 9 | 7.7 | |
| Example 2 | THIXON GPO | 14 | 11.9 | |
| Example 3 | THIXON GPO | 18 | 12.3 | broken |
| Example 4 | THIXON GPO | 21 | 10.4 | |
| Example 5 | Chemlock 250X | 9 | 3.5 | |
| Example 6 | Chemlock 250X | 14 | 5.4 | |
| Example 7 | Chemlock 250X | 18 | 5.5 | |
| Example 8 | Chemlock 250X | 21 | 4.7 | |
| Example 9 | TPO-300 | 9 | 2.8 | |
| Example 10 | TPO-300 | 14 | 4.3 | |
| Example 11 | TPO-300 | 18 | 4.4 | |
| Example 12 | TPO-300 | 21 | 3.8 | |
| Comparative Example 1 | TCV PA-18A | 9 | ≦1.0 | |
| Comparative Example 2 | TCV PA-18A | 14 | ≦1.0 | |
| Comparative Example 3 | TCV PA-18A | 18 | ≦1.0 | |
| Comparative Example 4 | TCV PA-18A | 21 | ≦1.0 | |

* THIXON GPO: Product of Morton International Co.
Chemlock 250X: Product of Road Far East Inc..
TPO-300: Product of The Yokohama Rubber Co., Ltd.
TCV PA-18A: Product of Totoku Toryo Co., Ltd.

*THIXON GPO: Product of Morton International Co.
Chemlock 250X: Product of Road Far East Inc.
TPO-300: Product of The Yokohama Rubber Co., Ltd.
TCV PA-18A: Product of Totoku Toryo Co., Ltd.

As obvious from the Examples mentioned above, according to the present invention, adhesive strength of a shrinkage control material to the elastomeric extrusion improved.

Therefore, with the shrinkage control material, an elastomeric molding slight in shrinkage or deformation during molding or due to temperature variation thereafter can be obtained.

While there has been shown and described what are at present considered the preferred embodiments of the invention, it will be obvious to those skilled in the art that various changes and modifications may be made therein without departing from the scope of the invention as defined by the appended claims.

What is claimed is:

1. An elastomeric article for a door window glassrun channel of a vehicle comprising:

a shrinkage-controlling portion comprising a resilient metal wire and a heat-treated adhesive layer on the metal wire; and an elastomeric portion extruded around an outer periphery of the shrinkage-controlling portion, the elastomeric portion being bonded by vulcanization to the shrinkage-controlling portion, wherein the metal wire is selected from the group consisting of a brass wire and a brass-plated steel wire, the adhesive layer comprises a chlorinated rubber and a chlorosulfonated polyethylene rubber, the adhesive layer is from 5 μm to 25 μm thick, and wherein the elastomeric extrusion comprises an ethylene-propylene-diene ternary copolymer.

2. The article of claim 1, wherein the thickness of the adhesive layer is from 12 to 22 μm.

* * * * *